United States Patent Office 3,526,680
Patented Sept. 1, 1970

3,526,680
MOULDING COMPOSITIONS FROM POLYACETALS AND COPOLYMERS OF α-OLEFINS/UNSATURATED CARBOXYLIC ACIDS CONTAINING METAL IONS
Harald Cherdron, Wiesbaden, Germany, assignor to Farbwerke Hoechst Aktiengesellschaft vormals Meister Lucius & Bruning, Frankfurt am Main, Germany, a corporation of Germany
No Drawing. Filed July 30, 1968, Ser. No. 748,630
Claims priority, application Germany, Aug. 30, 1967, F 53,356
Int. Cl. C08f 37/18
U.S. Cl. 260—897    12 Claims

ABSTRACT OF THE DISCLOSURE

The invention provides thermoplastic moulding compositions on the basis of polyacetals obtained by mixing homo- or copolymers of formaldehyde or trioxan with copolymers of α-olefins and α,β-unsaturated carboxylic acids containing ions of mono- to trivalent metals. The compositions are distinguished by an improved impact strength.

---

The present invention provides thermoplastic moulding compositions comprising a polyacetal and a copolymer of α-olefins with α,β-unsaturated carboxylic acids containing ions of mono- to trivalent metals.

It is known that the mechanical properties of various thermoplastic materials can be influenced by adding copolymers of α-olefins. French patent specification No. 1,287,912 discloses mixtures of ethylene/vinyl acetate copolymers with polyolefins, Belgian patent specification No. 609,574 discloses mixtures of the said copolymers with polyvinyl chloride and U.S. patent specification No. 2,953,541 discloses mixtures of ethylene/acrylic ester copolymers with polyethylene. Hence, the prior art relates to the modification of thermoplastic materials having a principal C—C chain, which are either amorphous or have a low crystallinity and do not differ essentially in this regard from the copolymers of α-olefins with vinyl or acrylic esters to be added.

The present invention provides thermoplastic moulding compositions comprising from 99.7 to 70% by weight of a polyacetal and 0.3 to 30% by weight of a copolymer from 50 to 99% by weight of α-olefins with 50 to 1% by weight of α,β-unsaturated carboxylic acids, which copolymers contain ions of mono- to trivalent metals.

The present invention furthermore provides a process for the manufacture of thermoplastic moulding compositions on the basis of polyacetals which comprises homogeneously mixing at a temperature above the crystallite melting point of the polyacetal, 99.7 to 70 parts by weight of a polyacetal with 0.3 to 30 parts by weight of a copolymer of 50 to 99% by weight of α-olefins and 50 to 1% by weight of α,β-unsaturated carboxylic acids, which copolymers contain ions of mono- to trivalent metals.

Suitable polyacetals to be used in the process of the invention are homopolymers of formaldehyde or trioxan in which the terminal hydroxyl groups are stabilized against degradation, for example by esterification or etherification, as well as copolymers of formaldehyde or trioxan. As comonomers for the trioxan there can be used above all cyclic ethers, cyclic acetals or linear acetals in an amount of 0.1 to 20 and preferably 1 to 5% by weight.

The cyclic ethers or cyclic acetals used to form the copolymer preferably have the general Formula I (I)    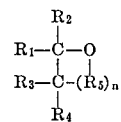

in which $R_1$ to $R_4$ each represents a hydrogen atom or an alkyl radical or a halogen-substituted alkyl radical, and $R_5$ stands for a methylene or oxymethylene radical, an alkyl- or halogenoalkyl-substituted methylene or oxymethylene radical, $n$ stands for 0 or an integer from 1 to 3, or the radical —(O—CH$_2$—CH$_2$)$_m$—OCH$_2$—, in the latter case $n$ being 1 and $m$ an integer from 1 to 3. The aforesaid alkyl radicals contain 1 to 5 carbon atoms and may be substituted with 1 to 3 halogen atoms, preferably chlorine atoms.

As comonomers there are used cyclic ethers having from 3 to 5 atoms in the ring, preferably epoxides, for example ethylene oxide and epichlorohydrin, or cyclic acetals having from 5 to 11 and preferably from 5 to 8 atoms in the ring, advantageously cyclic formals of α,ω-diols with 2 to 8 and preferably 2 to 4 carbon atoms, the carbon chain of which may be interrupted in intervals of 2 carbon atoms by an oxygen atom, for example 1,3-dioxolane, 1,3-dioxepane and 1,3,6-trioxocane, as well as linear polyformals, for example polydioxolane.

Suitable cyclic ethers are furthermore propylene oxide, styrene oxide, cyclohexene oxide, phenylglycidyl ether and butane-diol glycidyl ether and further suitable cyclic formals are 4-chloromethyl-1,3-dioxolane, 1,3-dioxonane and 1,3-dioxacycloheptene-(5).

With the use of the aforesaid cocomponents polyacetals are obtained having in the macromolecular chain in statistical distribution oxymethylene units of the formula —OCH$_2$— and furthermore groups with several adjacent carbon atoms, especially oxalkylene units of the formula —O—(CH)$_x$ in which $x$ stands for an integer from 2 to 8, preferably from 2 to 4.

By copolymers of α-olefins with α,β-unsaturated carboxylic acids containing ions of mono- to trivalent metals there are to be understood:

(a) polymeric compounds containing in the macromolecule in statistical distribution structural units of the general Formulae IIa and IIb (II)    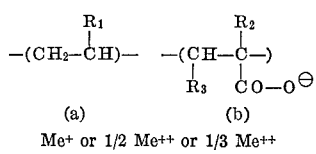

(a)         (b)

Me$^+$ or 1/2 Me$^{++}$ or 1/3 Me$^{+++}$ in which $R_1$ represents a hydrogen atom or a saturated aliphatic alkyl radical containing 1 to 12 and preferably 1 to 5 carbon atoms, $R_2$ stands for a hydrogen atom, a methyl, ethyl or carboxymethyl radical, $R_3$ is a hydrogen atom or a carboxyl radical and Me$^+$, Me$^{++}$ and Me$^{+++}$ represent ions of monovalent, bivalent or trivalent metals, (b) polymeric compounds containing in the macromolecule in statistical distribution structural units of the general Formulae IIIa, IIIb, and IIIc

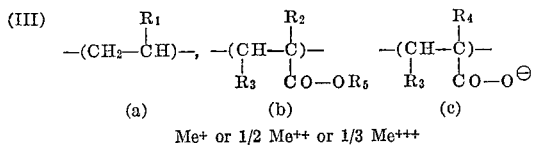

Me+ or 1/2 Me++ or 1/3 Me+++ in which $R_1$, $R_2$ and $R_3$, Me+, Me++ and Me+++ have the meanings given above, $R_5$ represents a saturated aliphatic alkyl radical containing 1 to 12 carbon atoms, preferably 1 to 5 carbon atoms, and $R_4$ has the same meaning as $R_2$.

Suitable α-olefins are, in the first place, α-olefins containing 2 to 6 carbon atoms, for example ethylene, propylene and butene-(1); ethylene being preferred.

α-β-Unsaturated carboxylic acids to be used in the process of the invention are especially monocarboxylic acids containing 3 to 5 carbon atoms, for example acrylic acid and methacrylic acid, as well as dicarboxylic acids containing 4 to 6 carbon atoms, for example itaconic acid, maleic acid and fumaric acid; acrylic acid and methacrylic acid being preferred.

Especially good results are obtained with copolymers of ethylene with maleic acid, methacrylic acid or itaconic acid containing ions of the alkali metals, preferably sodium ions.

Graft polymers of α,β-unsaturated carboxylic acids on polyolefins, which have been reacted with an alkali metal hydroxide are also well suitable.

The content of α-olefins in the copolymers specified sub (a) and (b) should amount to at least 50 mol percent, preferably 80 to 99 mol percent. It is not necessary that all carboxyl groups are neutralized by metal ions, the products preferably have a content of free carboxyl groups of less than 90%. The copolymers according to (a) and (b) should have a molecular weight above 5000 and may have a molecular weight up to one million; copolymers having a molecular weight in the range of from 50,000 to 250,000 being preferred.

Mono- to trivalent metals that can be used according to the invention are alkali metals such as sodium, potassium, lithium, rubidium and cesium, alkaline earth metals such as calcium, barium, strontium as well as aluminium; alkali metal ions and especially sodium ions are preferred.

The copolymers specified sub (a) and (b) can be produced by known processes, for example the process described in Canadian patent specification No. 674,595.

The specified copolymers can be mixed with the polyacetals in any mixing apparatus, for example in roll mills, kneaders or extruders. The mixing temperature is advantageously above the crystallite melting point of the polyacetals, and may be from 150 to 250° C., preferably 170 to 200° C.

The amount of copolymer to be added depends on the desired properties of the polymer mixture and is advantageously in the range of from 0.3 to 30, preferably from 5 to 15% by weight.

The moulding compositions of the invention are distinguished by a noticeably improved impact strength. This property could not be expected since polyacetals are highly crystalline polymers having a degree of crystallinity of about 80% in which even a slight disturbance of their crystalline structure generally causes a distinct deterioration of the mechanical properties. The high impact strength is furthermore surprising since the copolymers to be added differ considerably in their structure from the polyacetals.

The polymer mixtures of the invention can be processed in the thermoplastic state, for example by injection moulding or extrusion, into shaped articles such as ingots, rods, sheets, ribbons or tubes having an improved impact strength as can be seen from the following examples and in the table.

The following examples serve to illustrate the invention but they are not intended to limit it thereto, the percentages being by weight unless otherwise stated.

EXAMPLE 1

In a double screw extruder 10 kilograms of a polyacetal (melt index $i_2$ at 190° C.=9 grams/10 minutes), obtained by homopolymerization of formaldehyde and subsequent esterification of the terminal hydroxyl groups of the semiacetal with acetic acid in known manner, were homogeneously mixed at 190° C. with a mean residence time in the cylinder of 8 minutes with 5% of a copolymer of ethylene with methacrylic acid (proportion by weight 90:10) the carboxyl groups of which had been neutralized with sodium ions (melt index below 0.1 g./10 minutes) and then granulated.

The improvement of the impact strength of the polyacetal brought about by this modification was measured in an impact bending test with notched test specimens according to German Industrial Standards (DIN) 53,453 and especially in a drop test. For this purpose injection moulded or extruded test plates having the dimensions 70 x 70 x 4 millimeters were exposed to an impact stress in such a manner that a drop hammer sliding on guides with little friction only was vertically dropped from different heights onto the plates that had been clamped on a frame. The striking point of the drop hammer was a hemisphere having a radius r of 10 millimeters. As measure of the impact strength there was used the falling height $F_{20}$ at which the impact energy was sufficient to break 20% of the test plates. Ten plates were tested per height. The results obtained are summarized in the table.

EXAMPLE 2

In a vertically arranged one crew extruder a polyacetal obtained by copolymerization of trioxan with 2% of ethylene oxide (melt index $i_2$ at 190° C.=9 grams/10 minutes) was mixed at 200° C. with varying amounts of a copolymer of ethylene with methacrylic acid (proportion by weight 90:10) the carboxyl groups of which had been neutralized with sodium ions (melt index below 0.1 gram/10 minutes). The improvement of the impact strength can be seen in the table.

EXAMPLE 3

As described in Example 2, a polyacetal obtained by copolymerization of trioxan with 2% of ethylene oxide (melt index $i_2$ at 190° C.=2.5 grams/10 minutes) was mixed with 5% of a graft polymer prepared by grafting in the presence of free radical liberating catalysts 6% of acrylic acid on to high pressure polyethylene and subsequently neutralizing with sodium hydroxide. The improvement of the impact strength can be seen in the table.

TABLE—Impact strength of modified ployoxymethylenes

| No. | Polyacetal | Copolymer added of Example— | Amount of copolymer percent by | Falling height, $F_{20}$[cm] [1] |
|---|---|---|---|---|
| 1 | Formaldehyde homopolymer. | | | 30 |
| 2 | do | 1 | 5 | 125 |
| 3 | Trioxan/ethylene oxide copolymer. | | | 30–40 |
| 4 | do | 2 | 1 | 50 |
| 5 | do | 2 | 3 | 75 |
| 6 | do | 2 | 10 | 175 |
| 7 | do | 3 | 5 | 110 |

[1] Height at which the impact energy was sufficient to break 20% of the plates.

What is claimed is:
1. Thermoplastic moulding compositions comprising from 99.7 to 70% by weight of:
 (a) a formaldehyde or trioxan homopolymer or
 (b) a copolymer from 99.9 to 80% by weight of trioxan and 0.1 to 80% by weight of a linear poly- formal or a cyclic ether or a cyclic acetal of the general formula (I)
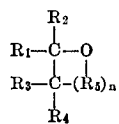

in which $R_1$, $R_2$, $R_3$ and $R_4$ each represents a hydrogen atom or an alkyl radical or a halogen-substituted alkyl radical, $R_5$ represents a methylene or oxymethylene radical, an alkyl or halogeno-alkyl-substituted methylene or oxymethylene radical, $n$ stands for 0 or an integer from 1 to 3 or the radical $-(O-CH_2-CH_2)_m-OCH_2-$, in which latter case $n$ being 1 and $m$ being an integer from 1 to 3, the said alkyl radicals containing 1 to 5 carbon atoms, and 0.3 to 30% by weight of a copolymer from 50 to 99% by weight of $\alpha$-olefins containing 2 to 14 carbon atoms and 50 to 1% by weight of $\alpha,\beta$-unsaturated carboxylic acids containing 3 to 6 carbon atoms, which copolymer contains ions of mono- to trivalent metals.

2. Thermoplastic moulding compositions according to claim 1, wherein copolymers of trioxan are used which contain in the macro-molecular chain in statistical distribution oxymethylene units and oxyalkylene units of the formula $-O-(CH_2)_x$ in which $x$ stands for an integer from 2 to 8.

3. Thermoplastic moulding compositions according to claim 1, wherein copolymers of trioxan with cyclic ethers containing 3 to 5 atoms in the ring are used.

4. Thermoplastic moulding compositions according to claim 1, wherein copolymers of trioxan and epoxides are used.

5. Thermoplastic moulding compositions according to claim 1, wherein copolymers of trioxan and ethylene oxide are used.

6. Thermoplastic moulding compositions according to claim 1, wherein copolymers of trioxan with cyclic acetals containing 5 to 11 atoms in the ring are used.

7. Thermoplastic moulding compositions according to claim 1, wherein copolymers of trioxan and 1,3-dioxolane are used.

8. Thermoplastic moulding compositions according to claim 1, wherein copolymers of $\alpha$-olefins containing 2 to 6 carbon atoms with $\alpha,\beta$-unsaturated monocarboxylic acids containing 3 to 5 carbon atoms, which copolymers contain alkali metal, alkaline earth metal or aluminium ions, are used.

9. Thermoplastic moulding compositions according to claim 1, wherein copolymers of ethylene and acrylic acid or methacrylic acid, which copolymers contain alkali metal ions, are used.

10. Thermoplastic moulding compositions according to claim 1, wherein copolymers of $\alpha$-olefins containing 2 to 6 carbon atoms with $\alpha,\beta$-unsaturated dicarboxylic acids containing 4 to 6 carbon atoms, which copolymers contain alkali metal, alkaline earth metal or aluminium ions, are used.

11. Thermoplastic moulding compositions according to claim 1, wherein copolymers of ethylene and maleic acid or itaconic acid, which copolymers contain alkali metal ions, are used.

12. Process for the manufacture of thermoplastic moulding compositions on the basis of polyacetals which comprises homogeneously mixing at a temperature above the crystallite melting point of the polyacetal 99.7 to 70 parts by weight of:
(a) a formaldehyde or trioxan homopolymer or
(b) a copolymer from 99.9 to 80 parts by weight of trioxan and 0.1 to 20 parts by weight of a linear polyformal or a cyclic ether or a cyclic acetal of the general formula (I)
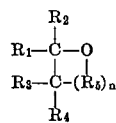

in which $R_1$, $R_2$, $R_3$ and $R_4$ each represents a hydrogen atom or an alkyl radical or a halogen-substituted alkyl radical and $R_5$ stands for a methylene or oxymethylene radical or an alkyl- or halogeno-alkyl-substituted methylene or oxymethylene radical, $n$ stands for 0 or an integer from 1 to 3, or the radical $-(O-CH_2-CH_2)_m$ in which latter case $n$ is 1, and $m$ stands for an integer from 1 to 3, the said alkyl radicals containing 1 to 5 carbon atoms, with 0.3 to 30 parts by weight of a copolymer from 50 to 99 parts by weight of $\alpha$-olefins containing 2 to 14 carbon atoms and 50 to 1 parts by weight of $\alpha,\beta$-unsaturated carboxylic acids containing 3 to 6 carbon atoms, which copolymers contain ions of mono-to trivalent metals.

References Cited

UNITED STATES PATENTS 2,775,572   12/1956   Fisk _____ 260—45.5

FOREIGN PATENTS 731,239   3/1966   Canada.

MURRAY TILLMAN, Primary Examiner

C. J. SECCURO, Assistant Examiner

U.S. Cl. X.R.

260—67